(12) United States Patent
Liu et al.

(10) Patent No.: US 12,338,401 B2
(45) Date of Patent: Jun. 24, 2025

(54) METHOD FOR REMOVING OXYGENATED COMPOUNDS FROM A FISCHER-TROPSCH OIL HAVING A HIGH CARBON NUMBER

(71) Applicant: Inner Mongolia Yitai Coal-based New Materials Research Institute Co., Ltd., Inner Mongolia (CN)

(72) Inventors: Hongyu Liu, Inner Mongolia (CN); Zhen Qian, Inner Mongolia (CN); Zhifei Li, Inner Mongolia (CN); Xiaolong Zhang, Inner Mongolia (CN); Juncheng Li, Inner Mongolia (CN); Qiang Xue, Inner Mongolia (CN); Xu Wang, Inner Mongolia (CN); Hui Zhang, Inner Mongolia (CN); Huai Guan, Inner Mongolia (CN); Yanyang Deng, Inner Mongolia (CN); Xiang Liu, Inner Mongolia (CN); Jiale Zuo, Inner Mongolia (CN)

(73) Assignee: Inner Mongolia Yitai Coal-based New Materials Research Institute Co., Ltd., Inner Mongolia (CN)

( * ) Notice: Subject to any disclaimer, the term of this patent is extended or adjusted under 35 U.S.C. 154(b) by 0 days.

(21) Appl. No.: 18/551,480

(22) PCT Filed: May 19, 2022

(86) PCT No.: PCT/CN2022/134666
§ 371 (c)(1),
(2) Date: Sep. 20, 2023

(87) PCT Pub. No.: WO2023/124690
PCT Pub. Date: Jul. 6, 2023

(65) Prior Publication Data
US 2024/0166958 A1    May 23, 2024

(30) Foreign Application Priority Data

Dec. 31, 2021   (CN) .......................... 202111667068.1

(51) Int. Cl.
*C10G 53/12* (2006.01)
*B01D 11/04* (2006.01)

(52) U.S. Cl.
CPC .......... *C10G 53/12* (2013.01); *B01D 11/0419* (2013.01); *B01D 11/0446* (2013.01); *B01D 11/0449* (2013.01); *B01D 11/0492* (2013.01); *C10G 2300/1022* (2013.01); *C10G 2300/202* (2013.01)

(58) Field of Classification Search
CPC ............ C10G 53/12; C10G 2300/1022; C10G 2300/202; C10G 21/16; B01D 11/0419; B01D 11/0446; B01D 11/0449; B01D 11/0492; B01D 11/0438
See application file for complete search history.

(56) References Cited

U.S. PATENT DOCUMENTS

| 2,918,486 A | 12/1959 | Binning et al. |
| 4,686,317 A * | 8/1987 | Quann ................... C10G 21/00 585/860 |
| 6,559,248 B2 | 5/2003 | Hendriksen et al. |
| 7,652,173 B2 | 1/2010 | Crause |
| 2003/0045655 A1 | 3/2003 | Hendriksen et al. |
| 2009/0054696 A1 | 2/2009 | Crause |
| 2021/0054296 A1 * | 2/2021 | Qian ..................... B01D 11/04 |

FOREIGN PATENT DOCUMENTS

| CN | 1549802 A | 11/2004 |
| CN | 113684056 A | 11/2021 |
| CN | 114479919 A | 5/2022 |
| JP | 2009506104 A | 2/2009 |
| WO | WO-2020001269 A1 * | 1/2020 ............. B01D 11/04 |

* cited by examiner

*Primary Examiner* — Randy Boyer
*Assistant Examiner* — Juan C Valencia
(74) *Attorney, Agent, or Firm* — Myers Bigel, P.A.

(57) ABSTRACT

The present disclosure relates to the technical field of chemical engineering, and specifically discloses a method for removing oxygenated compounds from a Fischer-Tropsch oil having a high carbon number. A reaction-extraction combined process is used in this method for removing oxygenated compounds from a Fischer-Tropsch oil having a high carbon number, wherein the Fischer-Tropsch oil (C5-C20) is firstly subjected to alkaline washing with an alkaline aqueous solution to convert acidic substances into water-soluble salts. The Fischer-Tropsch oil is subjected to a primary extraction with a carbonate-based extractant to remove alcohols and esters therein, and subsequently subjected to a secondary extraction with propylene carbonate to remove ketones and aldehydes impurities therein, thereby removing oxygenated compounds in the Fischer-Tropsch oil. After extraction, the content of the oxygenated compounds in the Fischer-Tropsch oil may be down to 1-60 ppm, and the yield of oil product may be kept 90% or more.

16 Claims, No Drawings

METHOD FOR REMOVING OXYGENATED COMPOUNDS FROM A FISCHER-TROPSCH OIL HAVING A HIGH CARBON NUMBER

CROSS REFERENCE TO RELATED APPLICATION

The present application is a 35 U.S.C. 371 national stage application of PCT International Application No. PCT/CN2022/134666 filed on May 19, 2022, which claims a priority of Chinese Patent Application No. 202111667068.1, filed on Dec. 31, 2021 with a title of "Method for removing oxygenated compounds from a Fischer-Tropsch oil having a high carbon number", each of which is incorporated herein by reference in their entireties.

TECHNICAL FIELD

The present disclosure relates to the technical field of chemical engineering, and particularly to a method for removing oxygenated compounds from a Fischer-Tropsch oil having a high carbon number.

BACKGROUND

Fischer-Tropsch oils have found a wide variety of downstream applications because of being rich in α-olefins. However, about 5 wt % of oxygenated compounds will be produced during the Fischer-Tropsch reaction, and the oxygenated compounds mainly comprise 5 classes, i.e., aldehydes, acids, alcohols, ketones and esters. Such impurities contained in a product will influence the application of downstream products, so it is necessary to take measures to remove the oxygenated compounds.

In CN106753546A (2017), a combined extractant of strongly basis water-containing dimethyl sulfoxide solution is used for removing oxygenated compounds, and after extraction, the Fischer-Tropsch synthetic light oil is then passed through a silica gel dryer. After that, the total content of the oxygenated compounds is less than 0.05%. In CN112745909A (2019), a combined extraction solvent of glycol is used, wherein the combined extraction solvent comprises a main solvent and a cosolvent, wherein the main solvent is a glycol-based compound, and the cosolvent is water, aqueous ammonia, an alcohol-amine-based compound, an amide-based compound or a sulfone-based compound. In this method, the yield of hydrocarbon-based compounds may be up to 96 mass % or more.

However, most of currently existing processes are directed to oil products having a low carbon number. The higher the carbon number of the oil products, the more difficult it is to remove the oxygenated compounds. Currently, it is still difficult to effectively remove oxygenated compounds from the oil products having a high carbon number.

In view of this, the present disclosure is proposed.

SUMMARY

An object of the present disclosure is at least provide a method for removing oxygenated compounds from a Fischer-Tropsch oil having a high carbon number, which is intended to effectively remove oxygenated compounds in an oil product having a high carbon number on the premise of ensuring the yield of oil product.

The present disclosure is achieved by the following technical solutions.

In a first aspect, the present disclosure provides a method for removing oxygenated compounds from a Fischer-Tropsch oil having a high carbon number, comprising: subjecting the Fischer-Tropsch oil to alkaline washing, water washing and extraction sequentially; wherein the extraction comprises a primary extraction and a secondary extraction, wherein the primary extraction is performed with a carbonate-based extractant, and the secondary extraction is performed with propylene carbonate; and wherein the Fischer-Tropsch oil has a carbon number in a range from 5 to 20.

In a possible embodiment, during the primary extraction, the Fischer-Tropsch oil and the carbonate-based extractant is controlled at a volume ratio in a range from 1:1 to 1:10, and preferably in a range from 1:2 to 1:6; and preferably, the Fischer-Tropsch oil has a carbon number in a range from 10 to 20.

In a possible embodiment, the carbonate-based extractant is at least one selected from the group consisting of ethylene carbonate, butylene carbonate, diethyl carbonate, vinylene carbonate, dimethyl carbonate, ethyl methyl carbonate and trimethylene carbonate.

In a possible embodiment, during the secondary extraction, the Fischer-Tropsch oil and the propylene carbonate is controlled at a volume ratio in a range from 1:1 to 1:10, and preferably in a range from 1:2 to 1:6.

In a possible embodiment, the primary extraction and the secondary extraction are both performed in a sieve tray extraction column at an extraction temperature in a range of 20-25° C.; and preferably, the sieve tray extraction column has a vibration frequency in a range of 1-500 times/min and a sieve tray aperture ratio in a range of 1-99%, and a ratio of a spacing between sieve trays to a height of the sieve tray extraction column is in a range from 1:100 to 50:100.

In a possible embodiment, the alkaline washing is a treatment with an alkaline aqueous solution, wherein the alkaline aqueous solution contains at least one selected from the group consisting of NaOH, KOH, $NaHCO_3$, $Na_2CO_3$, $K_2CO_3$, $Ca(OH)_2$ and $KHCO_3$.

In a possible embodiment, the alkaline aqueous solution has a mass concentration in a range of 10-30%, and a volume ratio of the Fischer-Tropsch oil to the alkaline aqueous solution is in a range from 1:1 to 1:3; and preferably, the alkaline washing is operated for a period in a range of 1-3 h.

In a possible embodiment, the alkaline washing is performed under a stirring condition or in a static mixing device, and after the alkaline washing, the Fischer-Tropsch oil is left standing to be separated into layers; and preferably, when the static mixing device is used for the alkaline washing, the static mixing device is controlled at a ratio of reflux amount to produced amount in a range from 2:1 to 8:1.

In a possible embodiment, during the water washing, the Fischer-Tropsch oil and water is controlled at a volume ratio in a range from 1:2 to 1:4, and a time for water washing is in a range of 1-2 h.

In a possible embodiment, the water washing is performed under a stirring condition or in a static mixing device, and after the water washing, the Fischer-Tropsch oil is left standing to be separated into layers; and preferably, when the static mixing device is used for the water washing, the static mixing device is controlled at a ratio of reflux amount to produced amount in a range from 2:1 to 8:1.

DETAILED DESCRIPTION

The embodiments of the present disclosure may have the following advantageous effects: a reaction-extraction combined process is used, wherein the Fischer-Tropsch oil (C5-C20) is firstly subjected to alkaline washing with an alkaline aqueous solution to convert acidic substances into water-soluble salts, while fats are hydrolyzed and removed through water washing; then the Fischer-Tropsch oil is subjected to a primary extraction with a carbonate-based extractant to remove alcohols and esters therein, and subsequently subjected to a secondary extraction with propylene carbonate to remove ketones and aldehydes impurities therein, thereby achieving the object of effectively removing oxygenated compounds in the Fischer-Tropsch oil. After extraction, the content of the oxygenated compounds in the Fischer-Tropsch oil is down to 1-60 ppm, and the yield of oil product is kept 90% or more.

In order to make the objects, technical solutions and advantages of the present disclosure more clear, the technical solutions of embodiments of the present disclosure will be described in detail below. Where particular conditions are not indicated in the embodiments, the embodiments will be implemented under conventional conditions or the conditions recommended by the manufacturers. Where the manufacturers of reagents or instruments are not indicated, they are all common products commercially available from the market.

The present disclosure provides a method for removing oxygenated compounds from a Fischer-Tropsch oil having a high carbon number in which a reaction-extraction combined process is used. The method has excellent treatment effect to the Fischer-Tropsch oil having a carbon number in a range from C5 to C20 (preferably from C10 to C20), can effectively remove oxygenated compounds in the Fischer-Tropsch oil, and ensure the yield of the Fischer-Tropsch oil. The method specifically comprises the following steps.

S1: Alkaline Washing

The Fischer-Tropsch oil is subjected to alkaline washing to convert acidic substances into water-soluble salts, while fats are hydrolyzed, and removed through subsequent step of water washing.

Specifically, the alkaline washing is performed with an alkaline aqueous solution at a ambient temperature (20-25° C.). The alkaline aqueous solution contains at least one selected from the group consisting of NaOH, KOH, $NaHCO_3$, $Na_2CO_3$, $K_2CO_3$, $Ca(OH)_2$ and $KHCO_3$. One kind of alkaline raw material or several kinds of alkaline raw materials may be used in the alkaline aqueous solution, which is not limited herein.

In some embodiments, the mass concentration of the alkaline aqueous solution is in a range of 10-30%, and specifically 10%, 15%, 20%, 25%, 30% or the like, or any value between the neighboring mass concentrations above; and a volume ratio of the Fischer-Tropsch oil to the alkaline aqueous solution is in a range from 1:1 to 1:3, and specifically 1:1, 1:2, 1:3 or the like, or any value between the neighboring ratio values above; and the alkaline washing is operated for a period in a range of 1-3 h, specifically 1 h, 1.5 h, 2 h, 2.5 h, 3 h or the like, or any value between the neighboring period values above.

In some embodiments, for the purpose of complete reaction, the alkaline washing is performed under a stirring condition or in a static mixing device, and after the alkaline washing, the Fischer-Tropsch oil is left standing to be separated into layers; and a time for standing may be in a range of 20-60 min.

Specifically, the static mixing device may be a typical static mixer, and may be used to replace stirring. In operation, the output at the outlet of the static mixer will be refluxed back into the inlet. Typically, the static mixing device is controlled at a ratio of reflux amount to produced amount in a range from 2:1 to 8:1; and the ratio may be 2:1, 3:1, 4:1, 5:1, 6:1, 7:1, 8:1 or the like, or any value between the neighboring ratio values above.

S2: Water Washing

Water washing may be performed with deionized water at ambient temperature (20-25° C.), wherein the Fischer-Tropsch oil and the deionized water are controlled at a volume ratio in a range from 1:2 to 1:4, and a time for water washing is in a range of 1-2 h, so as to sufficiently remove the salts produced from the alkaline washing or the like.

Specifically, the volume ratio of the Fischer-Tropsch oil to the deionized water may be 1:2, 1:3, 1:4 or the like, or any value between the neighboring volume ratios above; the time for water washing may be 1 h, 1.5 h, 2 h or the like, or any value between the neighboring time values above.

Also, the water washing is performed under a stirring condition or in a static mixing device, and after the water washing, the Fischer-Tropsch oil is left standing to be separated into layers; and a time for standing may be in a range of 20-60 min.

Also, the static mixing device may be a typical static mixer, and may be used to replace stirring. In operation, the output at the outlet of the static mixer will be refluxed back into the inlet. Typically, the static mixing device is controlled at a ratio of reflux amount to produced amount in a range from 2:1 to 8:1; and the ratio may be 2:1, 3:1, 4:1, 5:1, 6:1, 7:1, 8:1 or the like, or any value between the neighboring ratio values above.

S3: Primary Extraction

The primary extraction is performed with a carbonate-based extractant. The alcohols and esters in the Fischer-Tropsch oil may be removed through the primary extraction.

In some embodiments, during the primary extraction, the Fischer-Tropsch oil and the carbonate-based extractant is controlled at a volume ratio in a range from 1:1 to 1:10, and preferably in a range from 1:2 to 1:6. The volume ratio of the Fischer-Tropsch oil to the carbonate-based extractant may be 1:1, 1:2, 1:3, 1:4, 1:5 or the like, or any value between the neighboring ratio values above.

In some embodiments, the carbonate-based extractant is at least one selected from the group consisting of ethylene carbonate, butylene carbonate, diethyl carbonate, vinylene carbonate, dimethyl carbonate, ethyl methyl carbonate and trimethylene carbonate. All the above carbonate-based extractants may effectively remove the alcohols and esters in the Fischer-Tropsch oil. Single extractant or a mixture of extractants may be used, which is not limited herein.

In some embodiments, the primary extraction is performed in a sieve tray extraction column at an extraction temperature in a range of 20-25° C., i.e., at ambient temperature. The sieve tray extraction column has a vibration frequency in a range of 1-500 times/min and a sieve tray aperture ratio in a range of 1-99%, and a ratio of a spacing between sieve trays to a height of the sieve tray extraction column is in a range from 1:100 to 50:100.

Specifically, the vibration frequency of the sieve tray extraction column may be once/min, 20 times/min, 60 times/min, 80 times/min, 100 times/min, 120 times/min, 140 times/min, 160 times/min, 180 times/min, 200 times/min, 220 times/min, 240 times/min, 260 times/min, 280 times/min, 300 times/min, 320 times/min, 340 times/min, 360 times/min, 380 times/min, 400 times/min, 420 times/min, 440 times/min, 460 times/min, 480 times/min, 500 times/min or the like, or any value between the neighboring vibration frequencies above; the sieve tray aperture ratio may be 1%, 10%, 20%, 30%, 40%, 50%, 55%, 60%, 65%, 70%, 80%, 90%, 99% or the like, or any value between the neighboring aperture ratios above; and the ratio of sieve tray spacing to height of the sieve tray extraction column may be 1:100, 5:100, 10:100, 15:100, 20:100, 25:100, 30:100, 35:100, 40:100, 45:100, 50:100 or the like, or any value between the neighboring ratios above.

S4: Secondary Extraction

The secondary extraction is performed with propylene carbonate, and may effectively remove the ketones and aldehydes impurities in the Fischer-Tropsch oil.

In some embodiments, during the secondary extraction, the Fischer-Tropsch oil and the propylene carbonate is controlled at a volume ratio in a range from 1:1 to 1:10, and preferably in a range from 1:2 to 1:6. The volume ratio specifically may be 1:1, 1:2, 1:3, 1:4, 1:5 or the like, or any value between the neighboring volume ratios above.

In some embodiments, the primary extraction and the secondary extraction are both performed in a sieve tray extraction column at an extraction temperature in a range of 20-25° C., i.e., at ambient temperature. The sieve tray extraction column has a vibration frequency in a range of 1-500 times/min and a sieve tray aperture ratio in a range of 1-99%, and a ratio of a spacing between sieve trays to a height of the sieve tray extraction column is in a range from 1:100 to 50:100.

Specifically, the vibration frequency of the sieve tray extraction column may be once/min, 20 times/min, 60 times/min, 80 times/min, 100 times/min, 120 times/min, 140 times/min, 160 times/min, 180 times/min, 200 times/min, 220 times/min, 240 times/min, 260 times/min, 280 times/min, 300 times/min, 320 times/min, 340 times/min, 360 times/min, 380 times/min, 400 times/min, 420 times/min, 440 times/min, 460 times/min, 480 times/min, 500 times/min or the like, or any value between the neighboring vibration frequencies above; the sieve tray aperture ratio may be 1%, 10%, 20%, 30%, 40%, 50%, 55%, 60%, 65%, 70%, 80%, 90%, 99% or the like, or any value between the neighboring aperture ratios above; and the ratio of sieve tray spacing to height of the sieve tray extraction column may be 1:100, 5:100, 10:100, 15:100, 20:100, 25:100, 30:100, 35:100, 40:100, 45:100, 50:100 or the like, or any value between the neighboring ratios above.

It should be noted that conventional processes such as rectification may be used for recovering the extractant after the completion of the secondary extraction, which will not be described in detail herein.

The features and performances of the present disclosure will be described in further detail below with reference to Examples.

Example 1

This example provides a method for removing oxygenated compounds in a Fischer-Tropsch as follows.

Fischer-Tropsch oil raw material: the content of the oxygenated compounds in the Fischer-Tropsch oil (C8) is 5%, and the oxygenated compounds comprises alcohols, aldehydes, acids, esters and ketones, wherein the content of the alcohols is 3.2%, the content of the aldehydes is 0.4%, the content of the acids is 0.5%, the content of the esters is 0.4%, and the content of the ketones is 0.5%.

Alkaline washing and Water washing: 10 L of 10 wt % NaOH aqueous solution was added into 10 L of the Fischer-Tropsch oil; the resultant mixture was stirred for 1 hour and left standing for 30 min to be separated into layers; then the aqueous phase was removed, and 10 L of deionized water was added into the oil phase for water washing.

Primary extraction: after the water washing, 10 L of butylene carbonate extractant was added into the Fischer-Tropsch oil; wherein the rotation speed of the centrifugal extractor was 2000 r/min, the vibration frequency of the sieve tray extraction column was 80 times/min, the sieve tray aperture ratio of the sieve tray extraction column was 50%, and the sieve tray spacing of the sieve tray extraction column was 5% of the height of the sieve tray column.

Secondary extraction: after the extraction with butylene carbonate, 20 L of propylene carbonate was added into 10 L of the Fischer-Tropsch oil; wherein the vibration frequency of the sieve tray extraction column was 80 times/min, the sieve tray aperture ratio of the sieve tray extraction column was 50%, and the sieve tray spacing of the sieve tray extraction column was 5% of the height of the sieve tray column.

The content of the oxygenated compounds in the Fischer-Tropsch oil was detected to be 36 ppm, and the yield of oil product was 95%.

Example 2

This example provides a method for removing oxygenated compounds in a Fischer-Tropsch as follows.

Fischer-Tropsch oil raw material: the content of the oxygenated compounds in the Fischer-Tropsch oil (C8) is 5%, and the oxygenated compounds comprises alcohols, aldehydes, acids, esters and ketones, wherein the content of the alcohols is 3.4%, the content of the aldehydes is 0.5%, the content of the acids is 0.5%, the content of the esters is 0.3%, and the content of the ketones is 0.3%.

Alkaline washing and Water washing: 10 L of 5 wt % NaOH aqueous solution was added into 10 L of the Fischer-Tropsch oil; the resultant mixture was stirred for 1 hour and left standing for 30 min to be separated into layers; then the aqueous phase was removed, and 10 L of deionized water was added into the oil phase for water washing.

Primary extraction: after the water washing, 10 L of butylene carbonate extractant was added into the Fischer-Tropsch oil; wherein the vibration frequency of the sieve tray extraction column was 120 times/min, the sieve tray aperture ratio of the sieve tray extraction column was 50%, and the sieve tray spacing of the sieve tray extraction column was 5% of the height of the sieve tray column.

Secondary extraction: after the extraction with butylene carbonate, 20 L of propylene carbonate was added into 10 L of the Fischer-Tropsch oil; wherein the vibration frequency of the sieve tray extraction column was 120 times/min, the sieve tray aperture ratio of the sieve tray extraction column was 50%, and the sieve tray spacing of the sieve tray extraction column was 5% of the height of the sieve tray column.

The content of the oxygenated compounds in the Fischer-Tropsch oil was detected to be 30 ppm, and the yield of oil product was 94%.

Example 3

This example provides a method for removing oxygenated compounds in a Fischer-Tropsch as follows.

Fischer-Tropsch oil raw material: the content of the oxygenated compounds in the Fischer-Tropsch oil (C8) is 5%, and the oxygenated compounds comprises alcohols, aldehydes, acids, esters and ketones, wherein the content of the alcohols is 3.2%, the content of the aldehydes is 0.6%, the content of the acids is 0.6%, the content of the esters is 0.3%, and the content of the ketones is 0.3%.

Alkaline washing and Water washing: 10 L of 20 wt % NaOH aqueous solution was added into 10 L of the Fischer-Tropsch oil; the resultant mixture was stirred for 1 hour and left standing for 30 min to be separated into layers; then the aqueous phase was removed, and 10 L of deionized water was added into the oil phase for water washing.

Primary extraction: after the water washing, 20 L of butylene carbonate extractant was added into the Fischer-Tropsch oil; wherein the vibration frequency of the sieve tray extraction column was 80 times/min, the sieve tray aperture ratio of the sieve tray extraction column was 55%, and the sieve tray spacing of the sieve tray extraction column was 5% of the height of the sieve tray column.

Secondary extraction: after the extraction with butylene carbonate, 25 L of propylene carbonate was added into 10 L of the Fischer-Tropsch oil; wherein the vibration frequency of the sieve tray extraction column was 80 times/min, the sieve tray aperture ratio of the sieve tray extraction column was 55%, and the sieve tray spacing of the sieve tray extraction column was 5% of the height of the sieve tray column.

The content of the oxygenated compounds in the Fischer-Tropsch oil was detected to be 35 ppm, and the yield of oil product was 92%.

Example 4

This example provides a method for removing oxygenated compounds in a Fischer-Tropsch as follows.

Fischer-Tropsch oil raw material: the content of the oxygenated compounds in the Fischer-Tropsch oil (C8) is 5%, and the oxygenated compounds comprises alcohols, aldehydes, acids, esters and ketones, wherein the content of the alcohols is 3.5%, the content of the aldehydes is 0.5%, the content of the acids is 0.5%, the content of the esters is 0.3%, and the content of the ketones is 0.2%.

Alkaline washing and Water washing: 10 L of 20 wt % NaOH aqueous solution was added into 10 L of the Fischer-Tropsch oil; the resultant mixture was stirred for 1 hour and left standing for 30 min to be separated into layers; then the aqueous phase was removed, and 10 L of deionized water was added into the oil phase for water washing.

Primary extraction: after the water washing, 10 L of butylene carbonate extractant was added into the Fischer-Tropsch oil; wherein the vibration frequency of the sieve tray extraction column was 120 times/min, the sieve tray aperture ratio of the sieve tray extraction column was 50%, and the sieve tray spacing of the sieve tray extraction column was 5% of the height of the sieve tray column.

Secondary extraction: after the extraction with butylene carbonate, 20 L of propylene carbonate was added into 10 L of the Fischer-Tropsch oil; wherein the vibration frequency of the sieve tray extraction column was 120 times/min, the sieve tray aperture ratio of the sieve tray extraction column was 50%, and the sieve tray spacing of the sieve tray extraction column was 5% of the height of the sieve tray column.

The content of the oxygenated compounds in the Fischer-Tropsch oil was detected to be 28 ppm, and the yield of oil product was 92.6%.

Example 5

This example provides a method for removing oxygenated compounds in a Fischer-Tropsch as follows.

Fischer-Tropsch oil raw material: the content of the oxygenated compounds in the Fischer-Tropsch oil (C8) is 5%, and the oxygenated compounds comprises alcohols, aldehydes, acids, esters and ketones, wherein the content of the alcohols is 3.8%, the content of the aldehydes is 0.5%, the content of the acids is 0.3%, the content of the esters is 0.2%, and the content of the ketones is 0.2%.

Alkaline washing and Water washing: 20 L of 5 wt % NaOH aqueous solution was added into 10 L of the Fischer-Tropsch oil; the resultant mixture was stirred for 1 hour and left standing for 30 min to be separated into layers; then the aqueous phase was removed, and 10 L of deionized water was added into the oil phase for water washing.

Primary extraction: after the water washing, 10 L of butylene carbonate extractant was added into the Fischer-Tropsch oil; wherein the vibration frequency of the sieve tray extraction column was 120 times/min, the sieve tray aperture ratio of the sieve tray extraction column was 50%, and the sieve tray spacing of the sieve tray extraction column was 5% of the height of the sieve tray column.

Secondary extraction: after the extraction with butylene carbonate, 20 L of propylene carbonate was added into 10 L of the Fischer-Tropsch oil; wherein the vibration frequency of the sieve tray extraction column was 120 times/min, the sieve tray aperture ratio of the sieve tray extraction column was 50%, and the sieve tray spacing of the sieve tray extraction column was 5% of the height of the sieve tray column.

The content of the oxygenated compounds in the Fischer-Tropsch oil was detected to be 38 ppm, and the yield of oil product was 91%.

Example 6

This example provides a method for removing oxygenated compounds in a Fischer-Tropsch as follows.

Fischer-Tropsch oil raw material: the content of the oxygenated compounds in the Fischer-Tropsch oil (C8) is 5%, and the oxygenated compounds comprises alcohols, aldehydes, acids, esters and ketones, wherein the content of the alcohols is 3.6%, the content of the aldehydes is 0.4%, the content of the acids is 0.4%, the content of the esters is 0.3%, and the content of the ketones is 0.3%.

Alkaline washing and Water washing: 10 L of 5 wt % NaOH aqueous solution was added into 10 L of the Fischer-Tropsch oil; a static mixing device was used at a ratio of relux amount to produced amount of 3:1; the resultant mixture was left standing for 30 min to be separated into layers; then the aqueous phase was removed, and 10 L of deionized water was added into the oil phase for water washing.

Primary extraction: after the water washing, 20 L of butylene carbonate extractant was added into the Fischer-Tropsch oil; wherein the vibration frequency of the sieve tray extraction column was 80 times/min, the sieve tray aperture ratio of the sieve tray extraction column was 55%, and the sieve tray spacing of the sieve tray extraction column was 5% of the height of the sieve tray column.

Secondary extraction: after the extraction with butylene carbonate, 25 L of propylene carbonate was added into 10 L of the Fischer-Tropsch oil; wherein the vibration frequency of the sieve tray extraction column was 80 times/min, the sieve tray aperture ratio of the sieve tray extraction column was 55%, and the sieve tray spacing of the sieve tray extraction column was 5% of the height of the sieve tray column.

The content of the oxygenated compounds in the Fischer-Tropsch oil was detected to be 34 ppm, and the yield of oil product was 93%.

Example 7

This example provides a method for removing oxygenated compounds in a Fischer-Tropsch as follows.

Fischer-Tropsch oil raw material: the content of the oxygenated compounds in the Fischer-Tropsch oil (C8) is 5%, and the oxygenated compounds comprises alcohols, aldehydes, acids, esters and ketones, wherein the content of the alcohols is 3.6%, the content of the aldehydes is 0.5%, the content of the acids is 0.5%, the content of the esters is 0.2%, and the content of the ketones is 0.2%.

Alkaline washing and Water washing: 10 L of 5 wt % NaOH aqueous solution was added into 10 L of the Fischer-Tropsch oil; a static mixing device was used at a ratio of relux amount to produced amount of 7:1; the resultant mixture was left standing for 30 min to be separated into layers; then the aqueous phase was removed, and 20 L of deionized water was added into the oil phase for water washing.

Primary extraction: after the water washing, 20 L of butylene carbonate extractant was added into the Fischer-Tropsch oil; wherein the vibration frequency of the sieve tray extraction column was 80 times/min, the sieve tray aperture ratio of the sieve tray extraction column was 55%, and the sieve tray spacing of the sieve tray extraction column was 5% of the height of the sieve tray column.

Secondary extraction: after the extraction with butylene carbonate, 25 L of propylene carbonate was added into 10 L of the Fischer-Tropsch oil; wherein the vibration frequency of the sieve tray extraction column was 80 times/min, the sieve tray aperture ratio of the sieve tray extraction column was 55%, and the sieve tray spacing of the sieve tray extraction column was 5% of the height of the sieve tray column.

The content of the oxygenated compounds in the Fischer-Tropsch oil was detected to be 30 ppm, and the yield of oil product was 93.5%.

Example 8

This example provides a method for removing oxygenated compounds in a Fischer-Tropsch as follows.

Fischer-Tropsch oil raw material: the content of the oxygenated compounds in the Fischer-Tropsch oil (C8) is 5%, and the oxygenated compounds comprises alcohols, aldehydes, acids, esters and ketones, wherein the content of the alcohols is 3.5%, the content of the aldehydes is 0.6%, the content of the acids is 0.5%, the content of the esters is 0.2%, and the content of the ketones is 0.1%.

Alkaline washing and Water washing: 10 L of 5 wt % NaOH aqueous solution was added into 10 L of the Fischer-Tropsch oil; the resultant mixture was stirred for 1 hour and left standing for 30 min to be separated into layers; then the aqueous phase was removed, and 10 L of deionized water was added into the oil phase for water washing.

Primary extraction: after the water washing, 10 L of butylene carbonate extractant was added into the Fischer-Tropsch oil; wherein the vibration frequency of the sieve tray extraction column was 80 times/min, the sieve tray aperture ratio of the sieve tray extraction column was 50%, and the sieve tray spacing of the sieve tray extraction column was 5% of the height of the sieve tray column.

Secondary extraction: after the extraction with butylene carbonate, 20 L of propylene carbonate was added into 10 L of the Fischer-Tropsch oil; wherein the vibration frequency of the sieve tray extraction column was 80 times/min, the sieve tray aperture ratio of the sieve tray extraction column was 50%, and the sieve tray spacing of the sieve tray extraction column was 5% of the height of the sieve tray column.

The content of the oxygenated compounds in the Fischer-Tropsch oil was detected to be 33 ppm, and the yield of oil product was 90.5%.

Example 9

This example provides a method for removing oxygenated compounds in a Fischer-Tropsch as follows.

Fischer-Tropsch oil raw material: the content of the oxygenated compounds in the Fischer-Tropsch oil (C8) is 5%, and the oxygenated compounds comprises alcohols, aldehydes, acids, esters and ketones, wherein the content of the alcohols is 3.3%, the content of the aldehydes is 0.6%, the content of the acids is 0.5%, the content of the esters is 0.4%, and the content of the ketones is 0.2%.

Alkaline washing and Water washing: 10 L of 20 wt % NaOH aqueous solution was added into 10 L of the Fischer-Tropsch oil; the resultant mixture was stirred for 1 hour and left standing for 30 min to be separated into layers; then the aqueous phase was removed, and 10 L of deionized water was added into the oil phase for water washing.

Primary extraction: after the water washing, 20 L of butylene carbonate extractant was added into the Fischer-Tropsch oil; wherein the vibration frequency of the sieve tray extraction column was 80 times/min, the sieve tray aperture ratio of the sieve tray extraction column was 60%, and the sieve tray spacing of the sieve tray extraction column was 10% of the height of the sieve tray column.

Secondary extraction: after the extraction with butylene carbonate, 25 L of propylene carbonate was added into 10 L of the Fischer-Tropsch oil; wherein the vibration frequency of the sieve tray extraction column was 80 times/min, the sieve tray aperture ratio of the sieve tray extraction column was 60%, and the sieve tray spacing of the sieve tray extraction column was 10% of the height of the sieve tray column.

The content of the oxygenated compounds in the Fischer-Tropsch oil was detected to be 32 ppm, and the yield of oil product was 92.5%.

Example 10

This example provides a method for removing oxygenated compounds in a Fischer-Tropsch as follows.

Fischer-Tropsch oil raw material: the content of the oxygenated compounds in the Fischer-Tropsch oil (C8) is 5%, and the oxygenated compounds comprises alcohols, aldehydes, acids, esters and ketones, wherein the content of the alcohols is 3.7%, the content of the aldehydes is 0.6%, the content of the acids is 0.4%, the content of the esters is 0.2%, and the content of the ketones is 0.1%.

Alkaline washing and Water washing: 10 L of 20 wt % NaOH aqueous solution was added into 10 L of the Fischer-Tropsch oil; the resultant mixture was stirred for 1 hour and left standing for 30 min to be separated into layers; then the aqueous phase was removed, and 10 L of deionized water was added into the oil phase for water washing.

Primary extraction: after the water washing, 10 L of butylene carbonate extractant was added into the Fischer- Tropsch oil; wherein the vibration frequency of the sieve tray extraction column was 100 times/min, the sieve tray aperture ratio of the sieve tray extraction column was 55%, and the sieve tray spacing of the sieve tray extraction column was 5% of the height of the sieve tray column.

Secondary extraction: after the extraction with butylene carbonate, 30 L of propylene carbonate was added into 10 L of the Fischer-Tropsch oil; wherein the vibration frequency of the sieve tray extraction column was 100 times/min, the sieve tray aperture ratio of the sieve tray extraction column was 55%, and the sieve tray spacing of the sieve tray extraction column was 5% of the height of the sieve tray column.

The content of the oxygenated compounds in the Fischer-Tropsch oil was detected to be 40 ppm, and the yield of oil product was 93.6%.

Comparative Example 1

This comparative example provides a method for removing oxygenated compounds in a Fischer-Tropsch as follows.

The composition of the Fischer-Tropsch oil product was the same as in Example 1.

The removal method in this comparative example differs from that in Example 1 merely in that butylene carbonate was replaced by ethylene glycol in the primary extraction.

The removal rate of alcohols was detected to be reduced by 35% as compared to Example 1, and the residual rate of extractant was 0.035%.

Comparative Example 2

This comparative example provides a method for removing oxygenated compounds in a Fischer-Tropsch as follows.

The composition of the Fischer-Tropsch oil product was the same as in Example 3.

The removal method in this comparative example differs from that in Example 3 merely in that butylene carbonate was replaced by glycerol in the primary extraction.

The removal rate of alcohols was detected to be reduced by 40% as compared to Example 3, and the residual rate of extractant in the Fischer-Tropsch oil was 0.033%.

Comparative Example 3

This comparative example provides a method for removing oxygenated compounds in a Fischer-Tropsch as follows.

The composition of the Fischer-Tropsch oil product was the same as in Example 6.

The removal method in this comparative example differs from that in Example 6 merely in that propylene carbonate was replaced by sulfolane in the secondary extraction.

The removal rates of aldehydes and ketones were detected to be reduced by 32% and 36% respectively, and the residual rate of extractant in the Fischer-Tropsch oil was 0.014%.

Comparative Example 4

This comparative example provides a method for removing oxygenated compounds in a Fischer-Tropsch as follows.

The composition of the Fischer-Tropsch oil product was the same as in Example 10.

The removal method in this comparative example differs from that in Example 10 merely in that propylene carbonate was replaced by N-methyl pyrrolidone in the secondary extraction.

The removal rates of aldehydes and ketones were detected to be reduced by 38% and 35% respectively, and the residual rate of extractant in the Fischer-Tropsch oil was 0.028%.

In summary, the embodiments of the present disclosure provide a method for removing oxygenated compounds from a Fischer-Tropsch oil having a high carbon number in which a reaction-extraction combined process is used. The method has the following advantages over existing technologies: (1) the method is suitable for removing oxygenated compounds in a high carbon oil product with a relatively high removal rate; (2) the reagents used in the process are non-toxic and easy to regenerate, meeting the requirements of environmental protection; and (3) the use of a sieve tray extraction column is more suitable for the process provided in the embodiments of the present disclosure, and can effectively remove oxygenated compounds while ensuring the yield of oil product.

The above embodiments are only preferred embodiments of the present disclosure, and are not intended to limit the present disclosure. For those skilled in the art, various modifications and variations may be made to the present disclosure. Any modification, equivalent replacement, improvement and the like made within the spirit and principle of the present disclosure should be included within the protection scope of the present disclosure.

What is claimed is:

1. A method for removing oxygenated compounds from a Fischer-Tropsch oil having a high carbon number, wherein the method comprises:
subjecting the Fischer-Tropsch oil to alkaline washing, water washing and extraction sequentially,
wherein the extraction comprises a primary extraction and a secondary extraction,
wherein the primary extraction is performed with a carbonate-based extractant, and the secondary extraction is performed with propylene carbonate,
wherein the Fischer-Tropsch oil has a carbon number in a range from 5 to 20,
wherein during the primary extraction, the Fischer-Tropsch oil and the carbonate-based extractant is controlled at a volume ratio in a range from 1:1 to 1:10,
wherein the carbonate-based extractant is at least one selected from the group consisting of ethylene carbonate, butylene carbonate, diethyl carbonate, vinylene carbonate, dimethyl carbonate, ethyl methyl carbonate and trimethylene carbonate.

2. The method according to claim 1, wherein during the primary extraction, the Fischer-Tropsch oil and the carbonate-based extractant is controlled at a volume ratio in a range from 1:2 to 1:6.

3. The method according to claim 1, wherein the carbonate-based extractant is at least one selected from the group consisting of diethyl carbonate, dimethyl carbonate and ethyl methyl carbonate.

4. The method according to claim 1, wherein during the secondary extraction, the Fischer-Tropsch oil and the propylene carbonate is controlled at a volume ratio in a range from 1:1 to 1:10.

5. The method according to claim 1, wherein the primary extraction and the secondary extraction are both performed in a sieve tray extraction column at an extraction temperature in a range of 20-25° C.

6. The method according to claim 1, wherein the alkaline washing is a treatment with an alkaline aqueous solution, wherein the alkaline aqueous solution contains at least one selected from the group consisting of NaOH, KOH, $NaHCO_3$, $Na_2CO_3$, $K_2CO_3$, $Ca(OH)_2$ and $KHCO_3$.

7. The method according to claim 6, wherein the alkaline aqueous solution has a mass concentration in a range of 10-30%, and the Fischer-Tropsch oil and the alkaline aqueous solution is at a volume ratio in a range from 1:1 to 1:3.

8. The method according to claim 7, wherein the alkaline washing is performed under a stirring condition or in a static mixing device, and after the alkaline washing, the Fischer-Tropsch oil is left standing to be separated into layers.

9. The method according to claim 1, wherein during the water washing, the Fischer-Tropsch oil and water is controlled at a volume ratio in a range from 1:2 to 1:4, and a time for water washing is in a range of 1-2 h.

10. The method according to claim 9, wherein the water washing is performed under a stirring condition or in a static mixing device, and after the water washing, the Fischer-Tropsch oil is left standing to be separated into layers.

11. The method according to claim 10, wherein when the static mixing device is used for the water washing, the static mixing device is controlled at a ratio of reflux amount to produced amount in a range from 2:1 to 8:1.

12. The method according to claim 2, wherein the Fischer-Tropsch oil has a carbon number in a range from 10 to 20.

13. The method according to claim 4, wherein during the secondary extraction, the Fischer-Tropsch oil and the propylene carbonate is controlled at a volume ratio in a range from 1:2 to 1:6.

14. The method according to claim 5, wherein the sieve tray extraction column has a vibration frequency in a range of 1-500 times/min and a sieve tray aperture ratio in a range of 1-99%, and a ratio of a spacing between sieve trays to a height of the sieve tray extraction column is in a range from 1:100 to 50:100.

15. The method according to claim 7, wherein the alkaline washing is operated for a period in a range of 1-3 h.

16. The method according to claim 8, wherein when the static mixing device is used for the alkaline washing, the static mixing device is controlled at a ratio of reflux amount to produced amount in a range from 2:1 to 8:1.

* * * * *